US010033607B2

(12) United States Patent
Badea et al.

(10) Patent No.: US 10,033,607 B2
(45) Date of Patent: Jul. 24, 2018

(54) PACKET LOSS DEBUG SYSTEM AND METHOD

(71) Applicant: FREESCALE SEMICONDUCTOR, INC., Austin, TX (US)

(72) Inventors: Dragos Adrian Badea, Bucharest (RO); Petru Lauric, Medford, MA (US)

(73) Assignee: NXP USA, Inc., Austin, TX (US)

( * ) Notice: Subject to any disclaimer, the term of this patent is extended or adjusted under 35 U.S.C. 154(b) by 131 days.

(21) Appl. No.: 14/972,955

(22) Filed: Dec. 17, 2015

(65) Prior Publication Data

US 2017/0104653 A1    Apr. 13, 2017

(30) Foreign Application Priority Data

Oct. 13, 2015  (RO) ............................... A201500729

(51) Int. Cl.
*G06F 11/36*   (2006.01)
*H04L 12/26*   (2006.01)
*H04L 12/24*   (2006.01)

(52) U.S. Cl.
CPC .......... *H04L 43/0829* (2013.01); *H04L 41/06* (2013.01); *H04L 43/04* (2013.01)

(58) Field of Classification Search
CPC ........... G05B 2219/13142; G05B 2219/23283; G05B 2219/23414; G05B 2219/24034; G05B 2219/24041; G05B 2219/33297; G06F 11/36; G06F 11/263; G06F 11/2656; G06F 11/3664

See application file for complete search history.

(56) References Cited

U.S. PATENT DOCUMENTS

| | | | |
|---|---|---|---|
| 7,516,364 B2 | 4/2009 | Gooch et al. | |
| 7,539,750 B1 * | 5/2009 | Parker | G06F 15/16 709/224 |
| 7,738,403 B2 | 6/2010 | Ottamalika et al. | |
| 8,131,840 B1 | 3/2012 | Denker | |
| 8,561,025 B1 | 10/2013 | Bisht et al. | |
| 8,605,588 B2 | 12/2013 | Sankaran et al. | |
| 8,649,283 B2 | 2/2014 | Okada et al. | |
| 8,774,045 B2 | 7/2014 | Yue et al. | |
| 9,088,496 B2 | 7/2015 | Vaidya et al. | |
| 9,569,232 B1 * | 2/2017 | Brandwine | G06F 9/455 |

(Continued)

*Primary Examiner* — Alvin Zhu

(57) ABSTRACT

A mechanism is provided for debugging of system-wide packet loss issues in network devices by automatically identifying packet loss conditions at runtime of the network device and by logging and analyzing relevant data to help diagnose the issues resulting in lost packets. A network programmer defines a path through the communications processor that identified packets should follow, and then hardware mechanisms within the modules of the communications processor are used to determine whether the packets are indeed following the defined path. If not, then the hardware mechanisms halt processing and logging being performed by all or part of the communications processor and provide logged information and packet information to an analysis tool for display. In this manner, debugging information can be provided in real time, along with a history of the packet's progress through the communication processor stages.

19 Claims, 4 Drawing Sheets

(56) References Cited

U.S. PATENT DOCUMENTS

2004/0117770 A1* 6/2004 Swoboda ............ G06F 11/3632
717/128
2006/0294427 A1* 12/2006 Glass ................. G06F 11/3636
714/31

* cited by examiner

PACKET LOSS DEBUG SYSTEM AND METHOD

BACKGROUND

Field

This disclosure relates generally to network communications processors, and more specifically, to capturing and identifying causes of packet loss in network communications processors.

Related Art

Modern computer networks pass data from an origin node to one or more destination nodes following a point-to-point protocol. Data packets are passed along a path of intermediate nodes between the origin and destination, forming a stream of packets. Intermediate nodes, including network devices such as routers and switches, read information in a header of each packet in a stream to determine the next node in the path to send the packet. Based upon the packet header information, the intermediate node can process the packet in various stages within a communications processor. Such processing can include selection of one or more output interfaces to forward a packet toward destination nodes, determination of access control list (ACL) treatment for the packet, determination of quality of service treatment for the packet, determination of accounting record keeping for the packet, determination of administrative treatment for the packet, and the like.

In order to perform such processing on packets in real time, a communication processor in the router or switch can include multiple processing stages in a pipeline and parallel pipelines can be used to process multiple packets at once. These stages can perform tasks such as reading the packet header information, determining destination input/output interfaces, and modifying metadata representing the packet header information to contain new routing information to facilitate the packet's transmission through the network device's switching fabric. In addition, network devices can filter packets based on certain criteria, including access control lists, or control the rate of packet flow based on certain criteria related to interface, precedence, quality of service group, or extended ACL criteria.

Programming the communication processor to address the various actions desired in forwarding and otherwise manipulating a specific packet includes how the packet information is passed from stage to stage. Such programming may include errors that result in a packet becoming "lost" and not arriving at the proper destination interface in the network device, or otherwise not being properly manipulated. Previous mechanisms for determining the nature of the errors in packet routing within a network device do not give information about lost packets in real time, thereby increasing the difficulty of debugging such programming. Further, these previous mechanisms can require the collection of a significant amount of data even before a determination that packets are being lost can be made. This can result in faulty network communication, degradation of service, and disgruntled users.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates identical items unless otherwise noted. The figures are not necessarily drawn to scale.

DETAILED DESCRIPTION

Embodiments of the present invention aid in debugging of system-wide packet loss issues in network devices by automatically identifying packet loss conditions at runtime of the network device and by logging and analyzing relevant data to help diagnose the issues resulting in lost packets. Embodiments provide this capability by providing a mechanism for a network programmer to define a path through the communications processor that identified packets should follow, and then hardware mechanisms within the modules of the communications processor can be used to determine whether the packets are indeed following the defined path. If not, then the hardware mechanisms can halt processing and logging being performed by all or part of the communications processor and provide logged information and packet information to an analysis tool for display to the network programmer. In this manner, debugging information can be provided in real time, along with a history of the packet's progress through the communication processor stages, which can make determining the source of the error quicker and more accurate than previous methods and systems.

Figure 1:
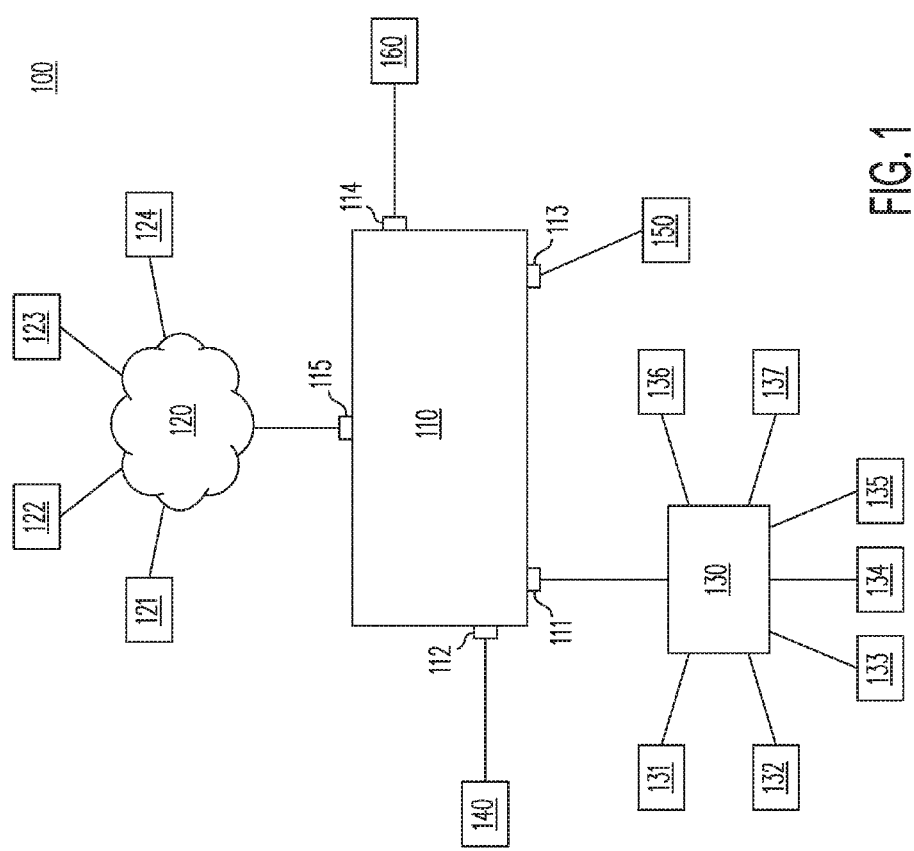
FIG. 1 is a simplified block diagram illustrating an example of a network environment that includes network devices that can incorporate embodiments of the present invention.

FIG. 1 is a simplified block diagram illustrating an example of a network environment that includes network devices that can incorporate embodiments of the present invention. Network 100 includes network devices such as a router 110 and a switch 130. Router 110 is coupled to a large area network 120 via a network interface 115. Router 110 is coupled by network interfaces 111, 112, 113, and 114 to local area nodes 130, 140, 150, and 160 respectively. Switch 130 is, in turn, coupled to network nodes 131, 132, 133, 134, 135, 136, and 137.

Network devices, such as router 110 and switch 130, are configured to receive network packets from any of the devices coupled to them at a network interface. The devices then can read packet information from a header of the packet and determine which network interface will be used to transmit the packet to the next hop toward the packet's destination. Depending on the nature of the network device, the device can store tables that identify neighboring nodes to which the device is directly connected, remote nodes known to the device due to previous communication, and which interfaces are connected to the neighboring devices or to a next hop node along a path to the remote node. Further, the network device can include information about how to process particular types of packets according to a variety of rules defined by network administration. For example, router 110 can process packets to determine: (a) which interface (111-115) on which to send a packet out, (b) modifications to a packet's header information prior to transmission, (c) whether to duplicate a packet for transmission on multiple interfaces (e.g., multicasting), and (d) whether to restrict a packet's transmission to a requested node (e.g., using access control lists). Similarly, switch 130 can review packet information and modify the packet's header information to simplify or enhance the packet's passage through the switch fabric.

In order to perform such tasks, network devices such as routers or switches include one or more communications processors configured to process the packet information appropriately and route the packets to their destination interface from the receiving interface. The communications processors are configured through programming provided by a network administrator or vendor of the network device. Communications processors provide a sequence of stages through which the packet information passes as the information is analyzed and modified. A processing core can be dedicated to a particular stage, or multiple stages, or dedicated hardware can be used for a particular stage or stages.

Figure 2:
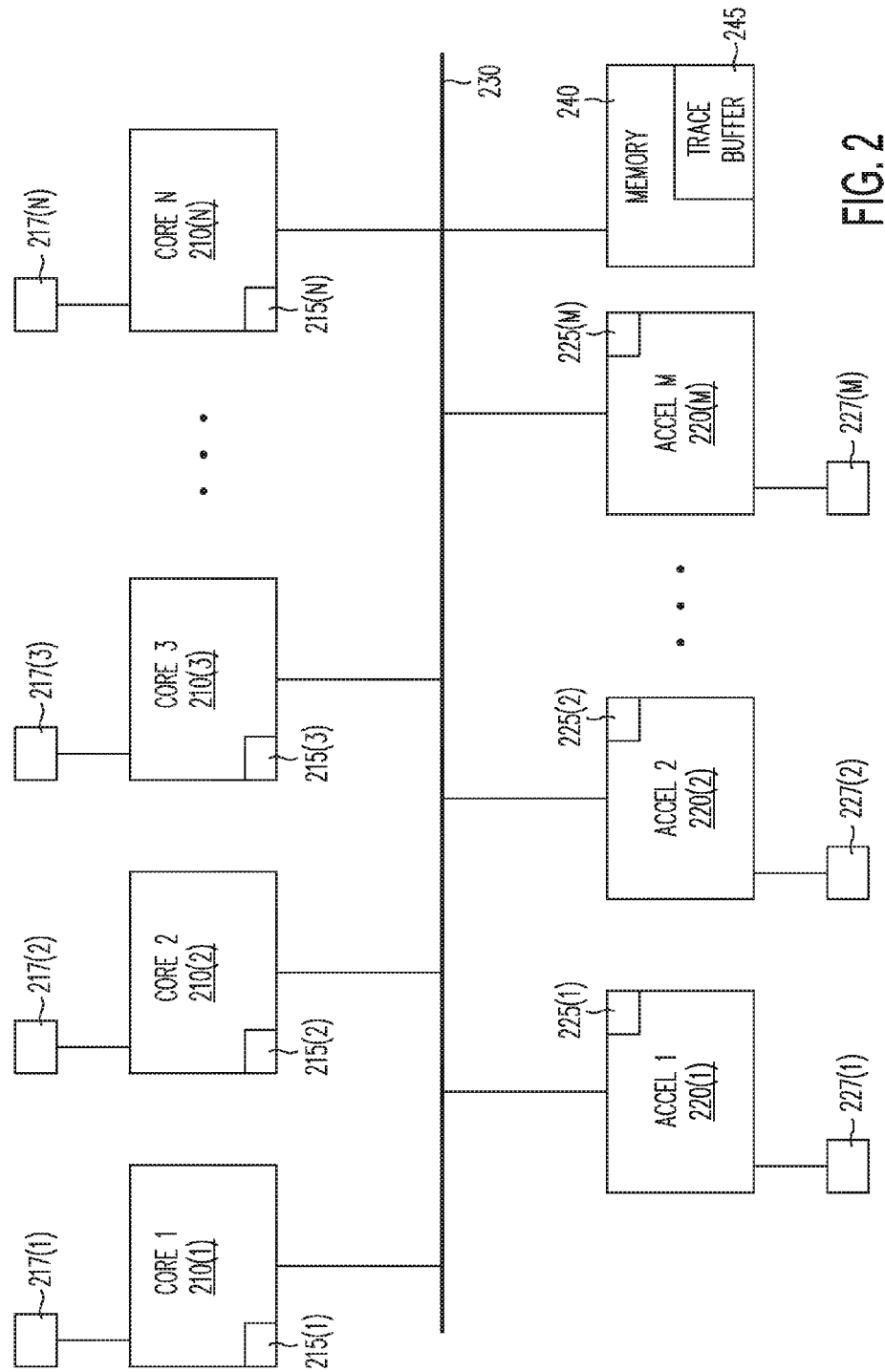
FIG. 2 is a simplified block diagram illustrating an example of a communication processor configurable to operate in accord with embodiments of the present invention.

FIG. 2 is a simplified block diagram illustrating an example of a communication processor 200 configurable to operate in accord with embodiments of the present invention. Communication processor 200 includes one or more processing cores 210(1)-210(N) and one or more task accelerator modules 220(1)-220(M), coupled to one another by a data bus 230. Each of the processing cores can be programmed to perform one or more stages related to the processing of a packet that has been received by the network device. The task accelerator modules can be configured to perform a single stage on the packet and to do so using specifically associated hardware.

A packet will arrive at an input/output interface of the network device (e.g., interface 111, 112, 113, 114, or 115), and then be preprocessed by the interface card or other logic associated with the interface. Such preprocessing can include storing the packet header and packet data in a memory 240, and then separating the packet header from the packet data as, in some embodiments, metadata. The packet header metadata can then be processed by the communications processor, in accord with the type of packet, destination of the packet, network configuration, and the like. The packet header metadata will typically progress from one stage to the next, by being processed by the core or task accelerator module associated with a stage, and then being passed to a next stage. This passage from stage to stage is performed according to programming of the cores and task accelerator modules in light of the tasks being performed on the packet.

A network administrator or programmer can configure the communication processor to process packets in light of specific needs for identified types of packets or situations. But errors in the programming can result in packets not being manipulated properly, or being lost in transitions from stage to stage. Such errors can include, for example, those that generate packet congestion, quality of service constraints that have enforcement resulting in packet misdirection, or other processor misconfigurations (e.g., packets being sent to an incorrect queue). In order to determine where a packet is being misdirected from a planned path, debug operations can be performed. But traditional programming debug operations for communication processors often do not clearly provide information regarding lost packets because those methods lack an ability to provide real-time information or information related to a single packet.

Embodiments of the present invention use hardware-provided debug circuitry to monitor progress of packets on an expected processing path through a communication processor. As illustrated in FIG. 2, each processing core and task accelerator include one or more packet watchpoint units 215(1)-215(N) and 225(1)-225(M) (PWU). PWUs are traditionally used as a general purpose observation mechanism for status of the processors and accelerators. Embodiments of the present invention configure each PWU to analyze contents of packets at key points in their processing. This includes information in the headers of the packets. In addition, each processing core has trace circuitry 217(1)-217(N) that can provide a log of packets and register status to a trace buffer 245 in memory 240. The trace log can include entries that include information such as timestamp, packet metadata, processing module identification, unique packet identifier, and additional information specific to the processing core or operation being performed in the processing core. Similar circuitry is provided in the task accelerators 220 to record log information (e.g., debug print modules 227(1)-227(M)). These logs provide a detailed view of system status at any time of packet processing. A user of the system can use these logs to track the progress of a packet through the various processing stages, and to determine what the state of those stages was at the times the packet traversed the stage.

Embodiments of the present invention allow for real-time monitoring of packet progress through the processing stages, so that should a packet stray from a specified path in the communication processor, information about the system state and the packet's path can be gathered at the time of discovery of packet loss. This is done through a combination of user provided processing path information and a capacity of the PWUs to halt system processing in response to a detected error.

Figure 3:
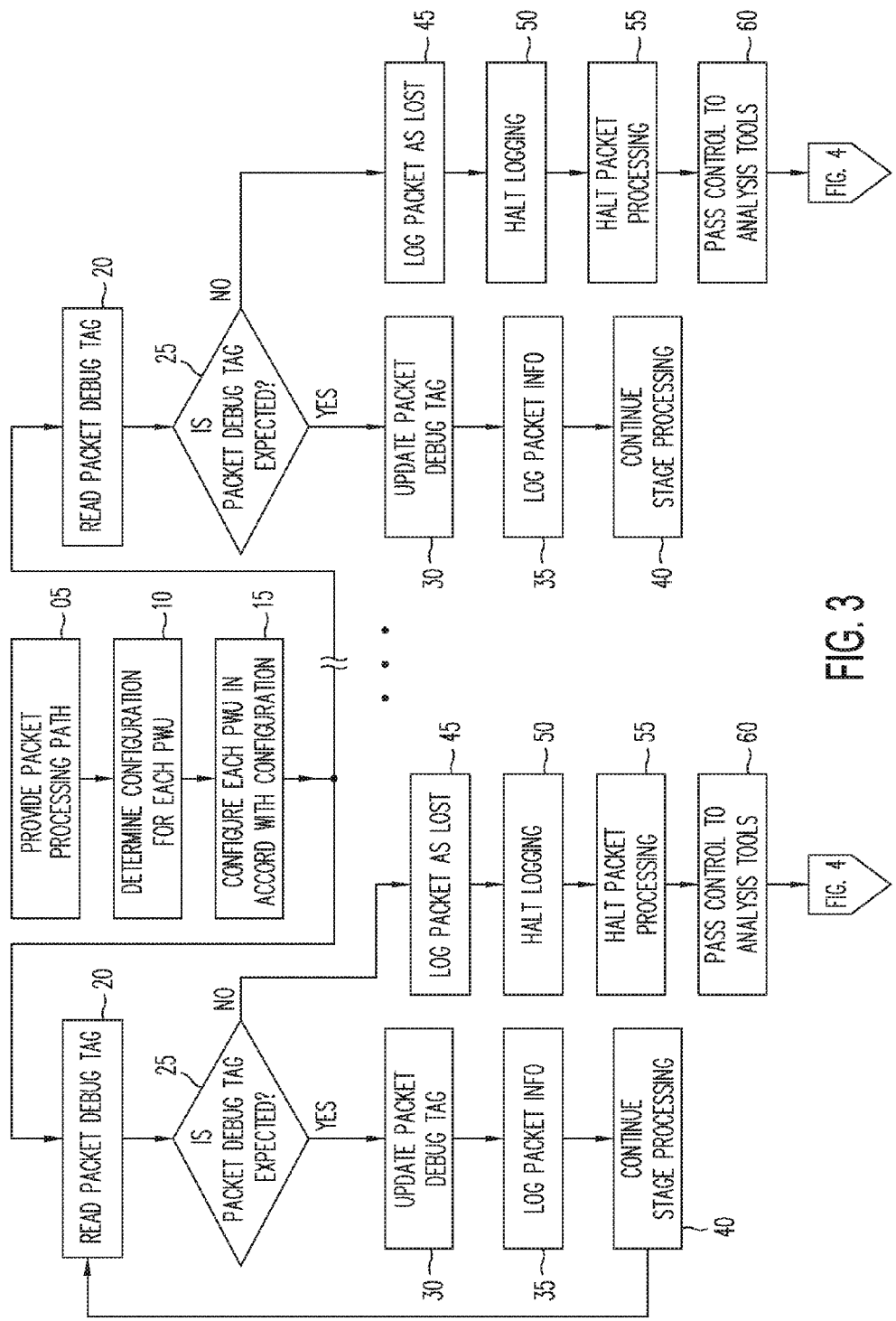
FIG. 3 is a simplified flow diagram illustrating a process for detecting lost packets in a communication processor, in accord with embodiments of the present invention.

FIG. 3 is a simplified flow diagram illustrating a process for detecting lost packets in a communication processor, in accord with embodiments of the present invention. The process begins with setting up the system for packet processing debug. In order for the system to accurately debug packet communication within the communication processor, the user (e.g., a network administrator or network programmer) provides the intended processing path that the packets of interest should follow within the communication processor (305). This identification of path can include the sequence of processing nodes the packet follows as it is processed (e.g., a core, a set of cores, accelerators, or software modules). The tracked nodes can be either hardware or software, depending upon the application. The user can provide this information to the system as an ordered list such as, for example, $Path_j=(N_1, N_2, \ldots, N_n)$, where each of $N_i$ is an identifier of the tracked node.

Once the path is determined, then a configuration for each PWU is determined in light of the path and other information desired to be tracked (e.g., log entry data) (310). The configuration includes identifying each PWU in the path, providing an output debug tag that will be associated with each PWU in the set from beginning to end of the path, and one or more action functions to be completed by each node PWU. The action function can include how to mark each packet successfully processed by the node, either one time (e.g., a single pass through the processing node) or for successive iterations (e.g., loop entry nodes). In addition, the action function can include how to mark a packet that incorrectly arrived at the node. The debug tag, which gets associated with the packet header metadata, can be defined as desired by the operation, but should provide a unique indication of how far the packet progressed through the stages of the communication processor (e.g., through a list or set of debug tags associated with the nodes traversed by the packet header). This configuration determination stage also includes automatically generating the instructions for each PWU to follow during packet processing. Once the configuration for each PWU in the path is determined, then each PWU is configured in accord with the associated instructions (315).

Once the PWUs are configured to respond to the identified packets, packet processing can begin. Such packet processing can be performed by a communications processor in, for example, a test network, a network in the field (e.g., a customer network), or using simulated packet generation to the network device. As illustrated, each PWU can perform the following processes as packets arrive at the associated core or task accelerator module in the communication processor.

As the packet is processed, a packet debug tag is associated with the packet header metadata of the packet and is modified by each PWU that accesses the packet along the packet's path. When the packet arrives at the PWU, the PWU will read the packet debug tag (320). Using the packet debug tag, the PWU determines whether the packet came from an immediately previous source or set of sources that was expected for that packet along the predetermined path or otherwise can determine whether the packet is expected (e.g., of a type that the node is configured to process) (325). If the packet debug tag indicates that the packet is expected, then the packet debug tag can be updated by the node (e.g., by using the action function as defined above) (330). In addition, the PWU can log packet-related information in an appropriate log file (335). As discussed above, the log information can be defined by the user to provide the best information to help determine how a packet got "lost" if it diverges from an expected path subsequent to arriving successfully at a node. Such information can include timestamp, identification of the processing module, unique identification of the packet, other module specific data, and the debug tag. Once the packet debug tag and log information have been generated and applied to their respective memory locations, processing by the stage associated with the PWU can continue (340). Alternatively, analysis by the PWU can be performed simultaneously with processing by the associated stage. Such parallel processing can improve the overall speed of the stage processing, but sequential processing can capture a waylaid packet prior to processing by the associated stage.

If the packet debug tag information is indicative of the packet unexpectedly arriving at the node (325), then the PWU can log the packet as being lost (345), as defined during the PWU configuration stage. Once the packet is logged as lost, the PWU can halt logging system-wide (350), in order to make the log files available to analysis tools. In addition, packet processing can be stopped either by the subsystem having the lost packet (e.g., core, set of cores, the pipeline, the I/O card, etc.) or the entire system (355). By halting processing, the states of various registers can be examined during debugging. Then control can be passed to a suite of analysis tools to help determine why the packet was misdirected (360).

If a packet is misdirected from the defined expected path, then the system can be stopped in real-time (as discussed above), and a set of analysis tools can be made available to the user. Previous debug methods do not provide such real-time analysis. Instead, the user must rely upon logs to find the lost packets, and may or may not be able to piece together the system state at the time of the error.

Figure 4:
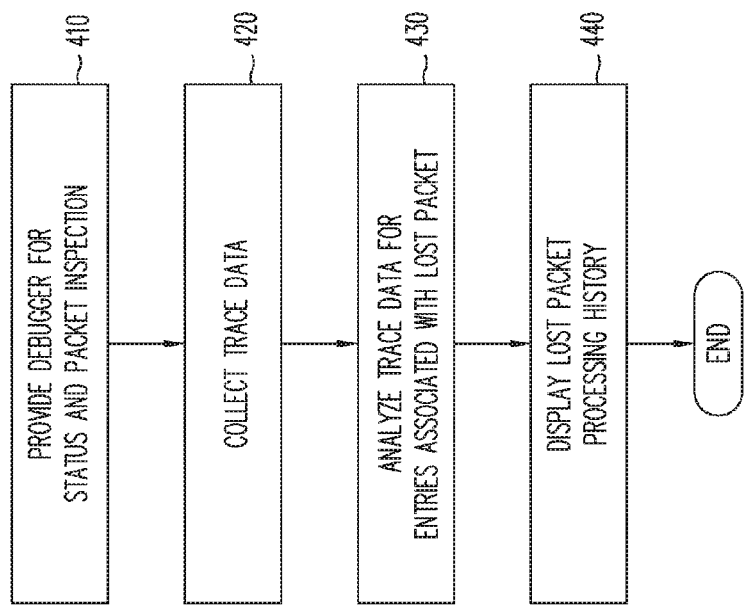
FIG. 4 is a simplified flow diagram illustrating a method that can be followed by the analysis tools to make a system state visible to the user to aid in packet debugging, in accord with embodiments of the present invention.

FIG. 4 is a simplified flow diagram illustrating a method that can be followed by the analysis tools to make a system state visible to the user to aid in packet debugging, in accord with embodiments of the present invention. The analysis tools can still provide access to a system debugger, which can aid in analysis of the state of various registers, queues, cores, and the like (410). But because the system was actually stopped in real-time by the PWUs in response to a misdirected packet, the information is that of the system at the time of discovery. This contemporaneous information about the system state can significantly enhance the ability of the person conducting analysis to determine where the error occurred.

In addition, the analysis tools can collect the trace data logged by the PWUs during the system run (420) from the storage memory. The trace data logs can be analyzed to find entries associated with the misdirected packet (430). This can be performed by searching the log entries for the unique identifier associated with the packet. In this manner, a history of the progress of the packet through the stages of the communication processor can be assembled. The assembled progress history can then be displayed to the user for any action to be taken (440). The history gives an idea of the packet processing events that took place in the various hardware and software modules the operated on the packet.

In the above manner, embodiments of the present invention aid in debugging of system-wide packet loss issues in network devices by automatically identifying packet loss conditions at runtime of the network device and by logging and analyzing relevant data to help diagnose the issues resulting in lost packets. Debugging information is provided in real time, along with a history of the packet's progress through the communication processor stages, which can make determining the source of the error quicker and more accurate than previous methods and systems.

By now it should be appreciated that there has been provided a communications processor configured to provide real-time packet debug. The communications processor includes one or more processing cores coupled to one another by a communication bus, one or more task accelerator modules coupled to the processing cores by the communication bus, a memory coupled to the processing cores and the task accelerator modules by the communication bus, and one or more packet watchpoint units (PWU) each associated with a packet processing core or a task accelerator module. The set of packet processing cores and the set of task accelerator modules are configurable to form stages of a packet processing pipeline in which a previous pipeline stage passes data packet information to a subsequent pipeline stage from an initial pipeline stage to a final pipeline stage. Each PWU is configured to determine if a packet received by the associated packet processing core or task accelerator module was expected to be received. Each packet processing core and task accelerator module is configured to log trace information regarding the packet, where the logged trace information is stored in the memory. Each PWU is configured to halt logging the trace information in response to a determination that the packet received by the associated packet processing core or task accelerator module was not expected to be received.

In one aspect of the above embodiment, the communications processor further includes a hardware trace unit associated with each processing core and each accelerator module where the hardware trace unit is configured to perform the logging of trace information. In another aspect, the PWU performs the determining if the packet was expected to be received by reading a packet debug tag associated with the packet header, and comparing information contained in the packet debug tag with expected packet data provided to the PWU. In a further aspect, the expected packet data is provided to the PWU during configuration of the PWU, and the configuration is performed prior to the packet being received by the processing core or task accelerator module. In a different further aspect, if the packet was expected to be received, the PWU is further configured to update the packet debug tag with information regarding progress of the packet, and submit the packet to the packet processing core or task accelerator module for stage processing. In another further aspect, the packet debug tag includes information indicative of the packet's path through the communications processor.

In another aspect of the above embodiment, a PWU is further configured to halt processing by the associated packet processing core or task accelerator module in response to a determination that the packet received by the associated packet processing module was not expected to be received. In a further aspect, the PWU is further configured to halt communications processor processing of packets in the pipeline.

In another aspect of the above embodiment, the PWU is further configured to transfer information related to the packet to a debug analysis tool in response to the determination that the packet received by the associated packet processing core or task accelerator module was not expected to be received.

In another embodiment, a method is provided for performing packet debut in a communications processor. The method includes reading a packet debug tag by a PWU associated with a stage of a packet processing pipeline and the packet debug tag is a portion of a header of a data packet being processed by the communications processor; determining if the packet debug tag was expected by the stage; updating the packet debug tag with information related to the stage and logging the packet information in a trace log, if the packet debug tag was expected; and if the packet debug tag was not expected, then logging the packet as lost in the trace log, halting logging of the trace log, and passing trace information and packet debug tag information to an analysis tool.

In one aspect of the above embodiment, updating the packet debug tag includes processing packet information using an action function defined prior to processing the packet debug tag, and revising the packet debug tag to include results of the action function. In a further aspect, the action function uses information from the packet debug tag as received by the stage of the packet processing pipeline to generate the revised packet debug tag.

In another aspect of the above embodiment, the method further includes halting processing by the packet processing pipeline and passing processor status information to the analysis tool if the packet debug tag was not expected. In yet another aspect, if the packet debug tag was not expected, then the method further includes halting processing by the stage of the packet processing pipeline and passing stage status information to the analysis tool. In still another aspect, the packet processing pipeline includes one or more packet processing cores with each configured to provide one or more stages of the packet processing pipeline. In a further aspect, the packet processing pipeline includes one or more task accelerator modules, each configured to provide one or ore stages of the packet processing pipeline.

In another aspect of the above embodiment, the method further includes providing an expected set of stages in the packet processing pipeline, determining a configuration of a PWU associated with each stage of the packet processing pipeline, and configuring each PWU in accord with the determined configuration associated with each PWU. The configuration is determined in part by the expected set of stages and in part by a set of information expected from the PWU. In a further aspect, determining if the packet debug tag was expected by the stage includes comparing information stored in the packet debug tag with information provided during the configuring of each PWU.

In yet another aspect of the above embodiment, the method further includes, if the packet was not expected, providing a system debug tool for analyzing register status of the communication processor and for analyzing the packet, collecting trace log information, analyzing the trace log information for entries associated with the unexpected packet, and displaying processing history of the unexpected packet.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/ dynamic load library and/or other sequence of instructions designed for execution on a computer system.

Some of the above embodiments, as applicable, may be implemented using a variety of different information processing systems. For example, although FIG. 2 and the discussion thereof describe an exemplary packet processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the processor instructions described herein may be received elements of system 200, for example, from computer readable media such as memory 240 or other media on other computer systems. Such computer readable media may be permanently, removably or remotely coupled to an information processing system such as system 200. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Although the invention is described herein with reference to specific embodiments, various modifications and changes can be made without departing from the scope of the present invention as set forth in the claims below. For example, any number of cores or task accelerator modules can be used. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A communications processor configured to provide real-time packet debug, the communications processor comprising:
   one or more packet processing cores coupled to one another by a communication bus;
   one or more task accelerator modules, coupled to the one or more processing cores by the communication bus;
   one or more packet watchpoint units, wherein
      each packet processing core and each accelerator module has an associated packet watchpoint unit,
      a set of the one or more packet processing cores and a set of the one or more task accelerator modules are configurable to form stages of a packet processing pipeline in which a previous pipeline stage passes data packet information to a subsequent pipeline stage from an initial pipeline stage to a final pipeline stage,
      each packet watchpoint unit is configured to determine if a packet received by the associated packet processing core or task accelerator module was expected to be received, and
      each packet processing core and task accelerator module is configured to log trace information regarding the packet,
      each packet watchpoint unit is configured to halt logging the trace information in response to a determination that the packet received by the associated packet processing core or task accelerator module was not expected to be received; and
   a memory, coupled to the one or more packet processing cores and the one or more task accelerator modules by the communication bus, and configured to store the log information regarding the packet.

2. The communications processor of claim 1 further comprising a hardware trace unit associated with each processing core and each accelerator module, wherein the hardware trace unit is configured to perform the logging of trace information.

3. The communications processor of claim 1 wherein the packet watchpoint unit performs said determining if the packet received was expected to be received by
   reading a packet debug tag associated with the packet header; and
   comparing information contained in the packet debug tag with expected packet data provided to the packet watchpoint unit.

4. The communications processor of claim 3, wherein
   the expected packet data is provided to the packet watchpoint unit during configuration of the packet watchpoint unit, and
   the configuration is performed prior to the packet being received by the packet processing core or task accelerator module.

5. The communication processor of claim 3, wherein, if the packet was expected to be received, the packet watchpoint unit is further configured to
   update the packet debug tag with information regarding progress of the packet, and submit the packet to the packet processing core or task accelerator module for stage processing.

6. The communication processor of claim 3, wherein the packet debug tag comprises information indicative of the packet's path through the communication processor.

7. The communication processor of claim 1 wherein a packet watchpoint unit of the one or more packet watchpoint units is further configured to halt processing by the associated packet processing core or task accelerator module, in response to a determination that the packet received by the associated packet processing module was not expected to be received.

8. The communication processor of claim 7 wherein the packet watchpoint unit of the one or more packet watchpoint units is further configured to halt communication processor processing of packets in the pipeline.

9. The communication processor of claim 1 wherein the packet watchpoint unit is further configured to transfer information related to the packet to a debug analysis tool, in response to the determination that the packet received by the associated packet processing core or task accelerator module was not expected to be received.

10. A method for performing packet debug in a communication processor, the method comprising:
    reading a packet debug tag, wherein
        said reading is performed by a packet watchpoint unit associated with a stage of a packet processing pipeline in the communication processor, and
        the packet debug tag is a portion of a header of a data packet being processed by the communication processor;
    determining if the packet debug tag was expected by the stage;
    if the packet debug tag was expected, then updating the packet debug tag with information related to the stage of the packet processing pipeline and logging packet information in a trace log; and
    if the packet debug tag was not expected, then
        logging the packet as lost in the trace log,
        halting logging of the trace log, and
        passing trace information and packet debug tag information to an analysis tool.

11. The method of claim 10 wherein said updating the packet debug tag further comprises:
    processing packet information using an action function defined prior to processing the packet debug tag; and
    revising the packet debug tag to include results of the action function.

12. The method of claim 11 wherein the action function uses information from the packet debug tag as received by the stage of the packet processing pipeline to generate the revised packet debug tag.

13. The method of claim 10 further comprising:
    if the packet debug tag was not expected, then halting processing by the packet processing pipeline, and passing processor status information to the analysis tool.

14. The method of claim 10 further comprising:
    if the packet debug tag was not expected, then halting processing by the stage of the packet processing pipeline, and passing stage status information to the analysis tool.

15. The method of claim 10 wherein the packet processing pipeline comprises one or more packet processing cores, each configured to provide one or more stages of the packet processing pipeline.

16. The method of claim 15 wherein the packet processing pipeline further comprises one or more task accelerator modules, each configured to provide one or more stages of the packet processing pipeline.

17. The method of claim 10 further comprising:
    providing an expected set of stages in the packet processing pipeline;
    determining a configuration of a packet watchpoint unit associated with each stage of the packet processing pipeline, wherein the configuration is determined in part by the expected set of stages and in part by a set of information expected from the packet watchpoint unit; and
    configuring each packet watchpoint unit in accord with the determined configuration associated with each packet watchpoint unit.

18. The method of claim 17 wherein said determining if the packet debug tag was expected by the stage further comprises:
    comparing information stored in the packet debug tag with information provided during said configuring each packet watchpoint unit.

19. The method of claim 10 further comprising, if the packet was not expected:
    providing a system debug tool for analyzing register status of the communication processor and for analyzing the packet;
    collecting trace log information;
    analyzing the trace log information for entries associated with the unexpected packet; and
    displaying processing history of the unexpected packet.

* * * * *